(No Model.)
J. J. BAILEY.
KNOB ATTACHMENT.
No. 535,186. Patented Mar. 5, 1895.
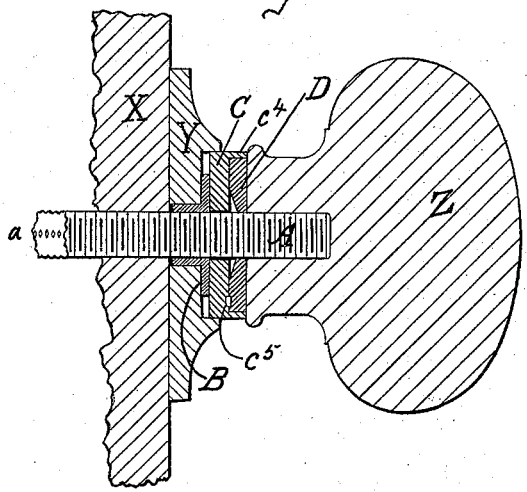
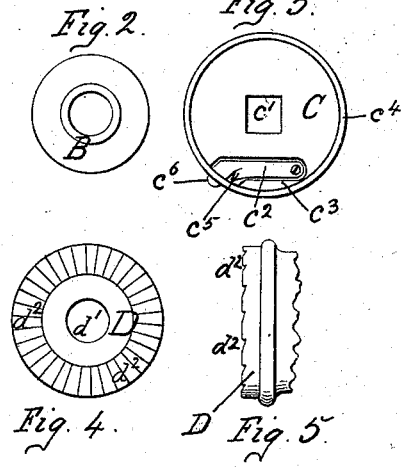
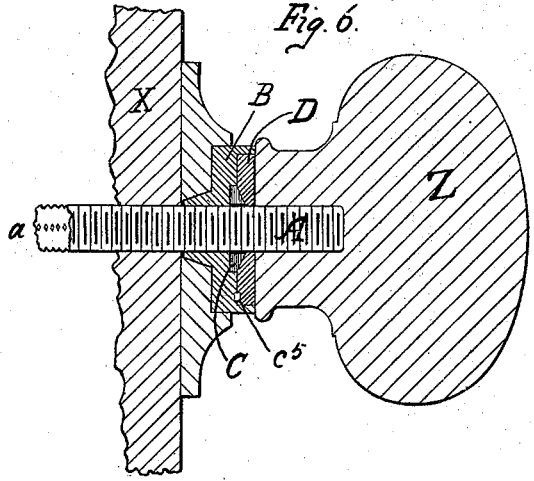
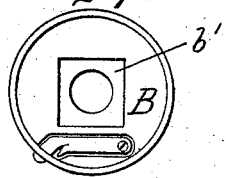
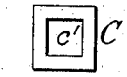
WITNESSES:
Kenneth L. Skinner
Athol G. Evans
INVENTOR
John James Bailey

UNITED STATES PATENT OFFICE.

JOHN JAMES BAILEY, OF LONDON, ENGLAND, ASSIGNOR OF ONE-FOURTH TO JAMES GRIEVE LORRAIN, OF SAME PLACE.

KNOB ATTACHMENT.

SPECIFICATION forming part of Letters Patent No. 535,186, dated March 5, 1895.

Application filed July 9, 1894. Serial No. 516,977. (No model.)

*To all whom it may concern:*

Be it known that I, JOHN JAMES BAILEY, a subject of the Queen of Great Britain, and a resident of Woodside Park, in the county of Middlesex, England, have invented certain new and useful Improvements in or Connected with Fastenings for Door-Handles, of which the following is a specification.

The objects of my invention are to provide a knob that can be secured to and removed from the spindle without the use of tools, to provide means for adjusting and automatically locking the knob in place in one operation, and to afford easy and convenient means for disengaging the knob from the spindle without marring or altering in any way the shape or ornamentation of the door handle.

In the accompanying sheet of drawings, Figure 1 is a longitudinal section of one form of my invention. Figs. 2, 3, 4 and 5 are details thereof. Fig. 6 is a longitudinal section of a modified form of my invention. Figs. 7 and 8 are details of the said modified form.

In the figures similar letters of reference apply to similar or equivalent parts.

A well known form of spindle for door handles consists of a rod of metal, square in cross section, and threaded at one or both extremities, the said thread being, for convenience of construction, cut at the angles only, so that although a nut or its equivalent can be screwed on to the said spindle, the latter still retains its more or less square shape in cross section.

In the drawings X represents in section a part of the door through which the spindle of the door handle passes, Y the ornamental washer usually employed and Z the door knob.

A is a spindle of the form above mentioned shown diagrammatically except at the part $a$ where it will be noticed that the thread is cut only at the angles. Upon the spindle A is screwed the threaded flanged washer B, hereinafter termed the back washer shown in position in Fig. 1 and separately in Fig. 2. Upon this spindle is then strung a washer C, hereinafter termed the locking washer, shown in position in Fig. 1 and detached in Fig. 3. This locking washer is perforated by a square or approximately square orifice $c'$ and has attached to it the spring catch $c^2$ which latter, in this case, lies in the recess $c^3$. The flange $c^4$ of the locking washer is convenient but not essential.

The spring catch consists preferably of a flat spring having a tooth or projection $c^5$ whose use will be described hereinafter. An extension $c^6$ of the said spring catch passes beyond the periphery of the locking washer for the purpose of enabling the said spring catch to be operated as hereinafter described.

Z, as has already been stated, is the knob or handle. To its inner face is attached the disk or ring D shown in its normal position in Fig. 1 and separately in Figs. 4 and 5. In Fig. 4 the said disk is shown in front elevation, and in Fig. 5 in side elevation as attached to a part of the shank of the knob. The knob has a perforation $d'$ extending through the disk D and having a female thread cut therein so that it may be screwed on to the spindle, that is to say, into the position shown in Fig. 1. On the front face of the said disk are cut radial notches or recesses as clearly shown in Figs. 4 and 5, which engage with the spring catch as will be presently described. The disk or ring D is not necessarily a separate disk or ring, as if the knob is made of sufficiently hard material, as for example of brass, the notches or recesses may be cut in the same. When however the knob is made of wood, glass or the like it is generally convenient to employ a separate disk or ring with the notches or recesses cut thereon. In such case the disk or ring is firmly attached to the knob by screws or other suitable means.

In order to put the several parts hereinbefore mentioned together so as to form a secure fastening, they are placed in position as shown in Fig. 1. Reference being made to this figure, the spindle with the fast knob thereon is first passed through the door from left to right. The ornamental washer Y is then passed over the protruding end of the spindle and brought up flush with the door. Then the back washer B is screwed close up to Y. The locking washer C is now passed on to the spindle and brought up flush with washer B. The orifice of the said locking washer being square it cannot turn upon the said spindle, but can only slide to and fro thereon. The knob is now screwed down so as to bring the notches or recesses of the disk D upon the knob into engagement with the tooth $c^5$ of the spring catch. On screwing on the knob the said notches ride over the tooth $c^5$ until when screwed up tight the tooth remains tightly engaged in one of the notches and locks the parts against backward movement, that is to say, against the unscrewing of the knob, in much the same manner as a click prevents recession of a ratchet wheel.

The extension $c^6$ of the spring catch passes outward beyond the periphery of the locking washer sufficiently far to enable the former to be pressed to one side by the finger nail or by a coin or knife blade or the like. When this is done, the aforesaid tooth is removed from engagement with the notch in which it lies, so that the handle can now be unscrewed in the usual way, that is to say, by turning the knob in a direction opposite to that in which it was screwed on to the spindle.

I have hereinbefore referred to the spindle as being of square section or approximately so; but I desire it to be understood that I prefer this form solely because it prevents the locking washer from turning round thereon, so that a spindle of any other form in cross section will answer my purpose provided it have an angle or angles to prevent such turning or be furnished with any of the usual devices employed by mechanics to prevent a washer or the like from turning upon a spindle.

It is not necessary that the spring catch should be attached to the locking washer. Thus in Figs. 6 and 7 I show the spring catch attached to the washer B, and by making the locking washer of small diameter I enable the spring catch to engage in the notches of disk D in a manner similar to that shown in the former case. In this case the locking washer consists of a simple square washer with a square orifice therein as shown in front elevation in Fig. 8 and in cross section in Fig. 6. The back washer is in this case fitted with a recess $b'$ into which the locking washer nests. The spring catch is fitted to the back washer in this case in the same manner as it is in the previous case to the locking washer. When the parts are screwed up into position as shown in Fig. 6 it will be seen that the tooth of the spring catch engages the notch of disk D in the same manner as in the case before specified. It will also be seen that when the parts are locked in position as shown in Figs. 1 and 6 there can be no turning of the knob upon the spindle.

What I claim as my invention, and desire to secure by Letters Patent, is—

The combination with the knob and spindle, back washer and locking washer, said knob provided with notches on its face, of the spring secured to one of said washers and provided with the tooth to engage with the notches to prevent the unscrewing of said knob, the projection integral with the spring and extending outside of said washers, whereby when pressure is made upon the projection, the tooth is released from engagement with the notches, substantially as described.

JOHN JAMES BAILEY.

Witnesses:
KENNETH L. SKINNER,
ATHOL G. EVANS.